May 20, 1969     W. E. SWITZER     3,445,614
AIR FLOW RESPONSIVE SWITCH FOR AIR CONDITIONED AUTOMOBILES
Filed Jan. 11, 1967
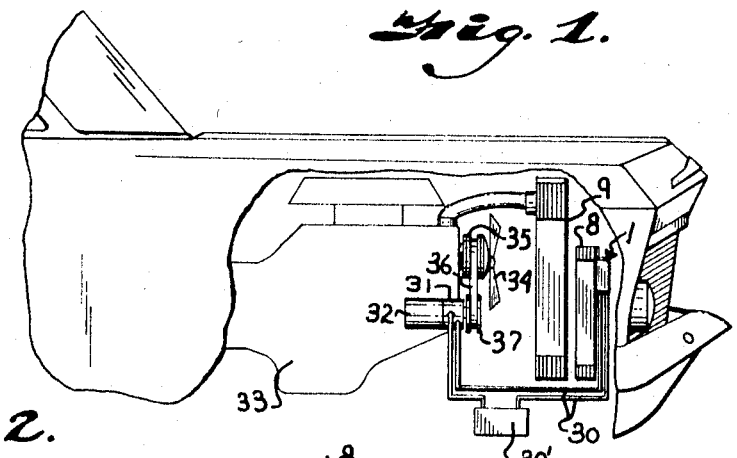
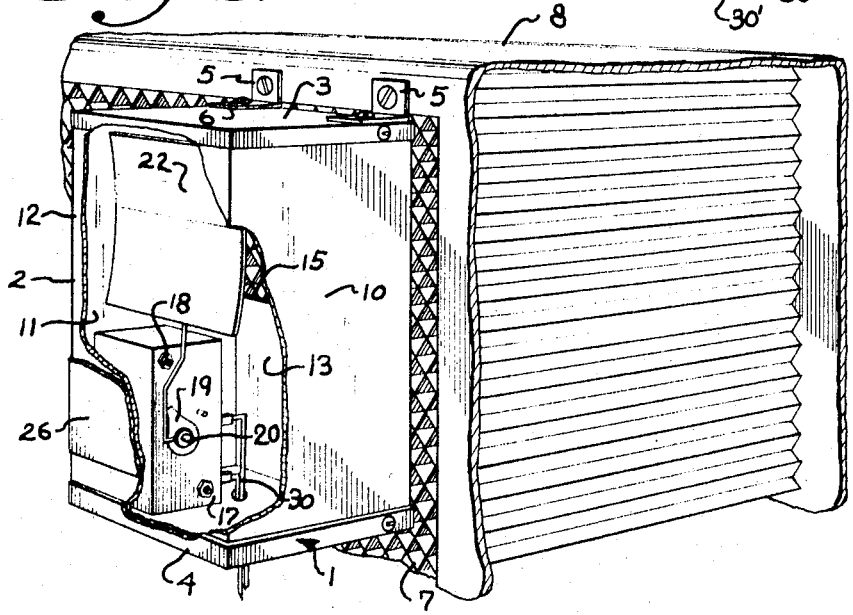
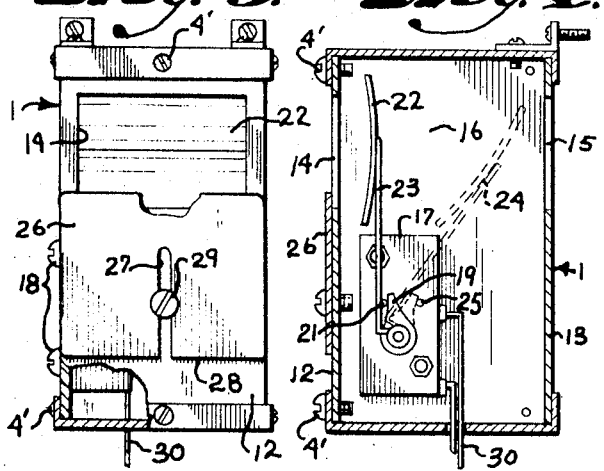
INVENTOR.
WILLIAM E. SWITZER
BY
Fishburn and Gold
ATTORNEYS

United States Patent Office 3,445,614
Patented May 20, 1969

3,445,614
AIR FLOW RESPONSIVE SWITCH FOR AIR
CONDITIONED AUTOMOBILES
William E. Switzer, Muskogee, Okla., assignor of one-fourth each to Robert G. Owen, William J. McKinney, and Joe R. Boatman
Filed Jan. 11, 1967, Ser. No. 608,530
Int. Cl. H01h 35/24, 35/40
U.S. Cl. 200—81.9           3 Claims

ABSTRACT OF THE DISCLOSURE

This disclosure relates to refrigeration air conditioning apparatus for automobiles, and more particularly to a radiator air flow actuated switch for operating the clutch of an air conditioning compressor. The switch includes a biased vane located in the path of radiator air flow and operating the swtich when a predetermined engine speed is reached. An adjustable baffle varies the required air velocity for switch actuation.

---

This invention resides in a novel air flow actuated switch in combination with an air conditioned automobile and has for its principal objects: to provide a simple, effective switch structure which is operative to disengage an electrically operated refrigeration compressor clutch in an automobile when the engine falls below a predetermined speed; to provide such a device which is responsive to variations in radiator air flow for operation; to provide such a switch which is easily adjustable so as to actuate under desired air flow-through conditions; to provide such a device which is easily mounted in existing or new installations; and to provide a device which is inexpensive in construction and yet rugged and reliable in use.

Other objects and advantages of this invention will become apparent from the following description taken in connection with the accompanying drawings wherein are set forth by way of illustration and example certain embodiments of this invention.

FIG. 1 is a partially schematic fragmentary side elevation showing the front portion of an automobile with parts broken away to show the switch relationship therein.

FIG. 2 is a fragmentary perspective view on an enlarged scale showing the switch mounted on the refrigeration condenser with portions broken away to show internal switch parts.

FIG. 3 is a front elevation of the switch particularly illustrating an adjustable air baffle.

FIG. 4 is a cross-sectional side elevation through the switch further showing the adjustable baffle and internal switch parts.

Referring to the drawings in more detail:

The reference numeral 1 generally indicates a novel switch embodying this invention. The switch 1 is comprised of a box-like housing 2, preferably of sheet metal, having an upper cap 3 and lower cap 4 suitably secured thereto by screws 4' for closing the upper and lower ends thereof. The upper cap 3 has brackets 5 fixed thereon by means of screws 6 for conveniently mounting the housing against the front face 7 of an air conditioning condenser 8 (FIGS. 1 and 2). It is to be understood that the housing 2 may also be mounted on the front or rear face of an automobile radiator 9 (FIG. 1) without departing from the scope of this invention.

The housing 2 includes side walls 10 and 11, a front wall 12, and a rear wall 13. The front and rear walls 12 and 13 each have openings 14 and 15 therethrough which are aligned and cover substantially half the area of the walls. A passageway 16 is defined between the respective openings 14 and 15 and forms a part of the normal air flow pattern into the front face 7 of the condenser 8 when the housing 2 is mounted with the rear well 13 in facing relation to front face 17 (FIG. 2).

A conventional electrical "micro" switch 17 is mounted within the housing 2 against the side wall 11 by means of screws 18. The switch 17 is of the type having a trigger 19 which opens and closes a circuit therethrough when rotated through a predetermined angle about an axis 20. The trigger 19 is internally spring loaded so as to normally maintain the position shown in FIG. 4, that is resting against a limit pin 21.

An operating vane 22 is mounted on a suitable lightweight arm 23 suitably secured to the trigger 19. Movement of the vane 22 from the normal position illustrated by the unbroken lines in FIG. 4 to the position 24 shown in broken lines results in the trigger 19 moving against a second limit pin 25 and, also, actuation of the switch 17. Thus, air flowing rearwardly through the passageway 16 between the openings 14 and 15 will cause the vane 22 to move to the position indicated at 24 resulting in the actuation of the switch 17.

A baffle plate 26 is comprised of sheet material having an enlongated upwardly extending slot 27 therethrough. The slot opens at the lower edge 28 of the plate 26. A screw 29 extends through the slot 27 and is threadedly engaged in the front wall 12. The screw 29 has a head greater in diameter than the width of the slot 27 whereby the head bears against the plate 26 when tightened so as to maintain the baffle plate in a desired vertical position with respect to the opening 14. By loosening the screw 29 the baffle plate 26 may be moved vertically with respect to the housing 2 for partially blocking the opening 14. This selectively reduces the air flow which can enter the opening 14 and react with the vane 22.

The switch 1, as noted above, is mounted on the front face of the condenser 8 so that a portion of the air flow through the condenser passes into the opening 14, through the passageway 16, and out the opening 15 where it enters the condenser. Wires 30 which are operably associated with the switch 17 pass through an opening in the lower cap 4 and are connected through the automobile battery, schematically sown at 30', to a conventional electrically operated clutch 31 associated with the air conditioning compressor 32. The engine 33 of the automobile drives a fan blade 34 in the usual manner, the blade being mounted on a pulley structure 35, A belt 36 engages the pulley structure 35 and a pulley 37 forming the input of the clutch 31, the output of the clutch 31 being connected to the compressor 32.

In operation, when the vane 22 is urged rearwardly to the position indicated at 24 (FIG. 4), a circuit is completed through the battery 30' and wires 30 to the clutch 31 which produces driving engagement between the pulley 37 and compressor 32. This causes the air conditioning system to function. When, however, the engine falls below a predetermined speed, for example, at idling, the spring trigger 19 presents sufficient force against the arm 23 to move the vane 22 forwardly, thus causing the switch to function to open the circuit, resulting in the disengagement between the pulley 37 and compressor 32. The vertical adjustment of the baffle plate 26 controls the quantity of moving air entering the passageway 16 and thus the engine speed at which the switch 17 will be actuated.

It is to be understood that although one form of this invention has been illustrated and described, it is not to be limited thereto, except insofar as such limitations are included in the following claims.

What I claim and desire to secure by Letters Patent is:
1. For use in an automobile having radiator air flow producing means varying air flow with engine speed,

(a) a refrigeration air conditioning system having an electrically operated compressor clutch,
(b) a switch including switch structure having a trigger movable between first and second switch structure actuating positions, means associated with said switch structure for resiliently biasing said trigger toward said first position,
(c) an air flow responsive member, means operably associating said member with said trigger for movement therewith,
(d) means mounting said switch on said automobile with said member in the air flow and positioned to respond to the air flow when above a predetermined velocity to move said trigger from said first to said second position against said biasing means, and
(e) means electrically connecting said switch structure to said clutch, whereby said clutch is actuated only when said engine is operating above a predetermined speed.

2. The combination as set forth in claim 1 wherein said switch includes:
(a) a housing having front and rear walls and forming an enclosure therein, said switch structure being mounted in said enclosure,
(b) openings in said front and rear walls forming an air flow passageway through said housing, said flow responsive member being located in said passageway.

3. The combination as set forth in claim 2 including:
(a) a baffle plate, and
(b) means adjustably mounting said baffle plate to said front wall to selectively partially block said front wall opening, said adjusting means including a slot in said baffle plate and a screw projecting through said slot and threadedly engaged in said housing.

References Cited

UNITED STATES PATENTS

| | | | |
|---|---|---|---|
| 1,615,853 | 2/1927 | Slayton | 200—81.9 |
| 2,121,651 | 6/1938 | Claytor | 200—81.9 |
| 2,226,785 | 12/1940 | Soucy | 200—81.9 |

FOREIGN PATENTS 702,789  2/1941  Germany.

ROBERT K. SCHAEFER, *Primary Examiner.*

H. BURKS, *Assistant Examiner.*

U.S. Cl. X.R.

62—244